United States Patent [19]
Arndt et al.

[11] Patent Number: 5,168,753
[45] Date of Patent: Dec. 8, 1992

[54] MEASURING DEVICE FOR DETECTING PARAMETERS CHARTERIZING THE OPERATING BEHAVIOR OF HYDRAULIC ASSEMBLES

[75] Inventors: Friedrich K. Arndt; Robert-Jan Bartels; Heribert Vielhaber, all of Essen, Fed. Rep. of Germany

[73] Assignee: Krupp Maschinentechnik Gesellschaft mit beschränkter Haftung, Essen, Fed. Rep. of Germany

[21] Appl. No.: 810,176

[22] Filed: Dec. 19, 1991

[30] Foreign Application Priority Data

Dec. 20, 1990 [DE] Fed. Rep. of Germany ....... 4040919

[51] Int. Cl.⁵ .......................... G01M 19/00; G01F 1/36
[52] U.S. Cl. ..................................... 73/168; 73/861.52
[58] Field of Search ................. 73/168, 702, 716, 717, 73/861.42, 861.44, 861.52, 861.61

[56] References Cited

U.S. PATENT DOCUMENTS

| | | | |
|---|---|---|---|
| 2,143,880 | 8/1964 | Goldstein et al. | 73/861.42 |
| 2,924,971 | 2/1960 | Schroeder et al. | 73/168 |
| 3,713,337 | 1/1973 | Stroman | 73/861.42 |
| 4,604,902 | 8/1986 | Sabin | 63/861.44 |
| 4,754,651 | 7/1988 | Shortridge et al. | 73/717 |
| 4,831,873 | 5/1989 | Charbonneau et al. | 73/168 |
| 5,086,655 | 2/1992 | Fredericks et al. | 73/861.52 |

FOREIGN PATENT DOCUMENTS

| | | |
|---|---|---|
| 0086259 | 8/1983 | European Pat. Off. |
| 0166502 | 1/1986 | European Pat. Off. |
| 0264148 | 4/1988 | European Pat. Off. |
| 2152699 | 4/1973 | Fed. Rep. of Germany |
| 2336179 | 2/1974 | Fed. Rep. of Germany |
| 2523600 | 12/1976 | Fed. Rep. of Germany |
| 3128072 | 6/1982 | Fed. Rep. of Germany |
| 3217111 | 1/1985 | Fed. Rep. of Germany |
| 3424692 | 2/1986 | Fed. Rep. of Germany |
| 3148735 | 10/1986 | Fed. Rep. of Germany |
| 3828933 | 3/1990 | Fed. Rep. of Germany |
| 658102 | 10/1986 | Switzerland |
| 2050611 | 1/1981 | United Kingdom |

OTHER PUBLICATIONS

Earles et al, "Pulsating Flow Measurement Using an Orifice-Manometer System", The Engineer, Technical Contributors Section, Dec. 1967, pp. 821-825.

Bavendiek, "Neue Methode zur Bestimmung der Verluste (Wikrungsgrade) an hydrostatischen Maschinen", o+p ölhydraulik und pneumatik 31 (1987), No. 11, pp. 861-866.

"Neues Konzept zur Überwachung hydraulischer Systeme", o+p ölhydraulik und pneumatik 29 (1984) No. 10, p.638.

Primary Examiner—William A. Cuchlinski, Jr.
Assistant Examiner—G. Bradley Bennett
Attorney, Agent, or Firm—Spencer, Frank & Schneider

[57] ABSTRACT

A measuring device connectable to a pressure conduit of a hydraulic circuit for determining characteristic operational parameters of hydraulic energy converters forming components of the hydraulic circuit includes a measuring section having a conduit guiding pressurized fluid of the pressure conduit and a throttle in the conduit for effecting a pressure drop thereacross; a differential pressure transducer communicating with the conduit at an upstream side and a downstream side of the throttle as viewed in a direction of fluid flow for determining a pressure differential across the throttle and for generating an output signal representing the pressure differential; and an electrotransducer connected to an output of the differential pressure transducer for separating the output signal into an alternating voltage component signal and a direct voltage component signal. The electrotransducer has an output to which the alternating voltage component signal and the direct voltage component signal are applied.

9 Claims, 4 Drawing Sheets

MEASURING DEVICE FOR DETECTING PARAMETERS CHARTERIZING THE OPERATING BEHAVIOR OF HYDRAULIC ASSEMBLES

CROSS REFERENCE TO RELATED APPLICATION

This application claims the priority of German Application No. P 40 40 919.8 filed Dec. 20, 1990, which is incorporated herein by reference.

BACKGROUND OF THE INVENTION

The present invention relates to a measuring device for detecting parameters that characterize the operating behavior of hydraulic assemblies, particularly energy generators (suppliers) such as pumps and energy consumers such as motors, percussion mechanisms and cylinders. The measuring device includes a measuring member with which the pressure conditions existing in the pressure conduit of the assembly can be determined.

The optimum use of hydraulic assemblies such as pumps, motors, percussion mechanisms and cylinders requires the monitoring of certain characteristic parameters, particularly the operating pressure and the input flow rate of hydraulic fluid. Since, for example, changes in the operational behavior of an energy generator or energy consumer (also termed collectively as "energy converters") caused by extraneous influences and/or wear generally occur only gradually and thus are not readily discernible for the operating personnel, a continuous or at least intermittently repeatable opportunity for monitoring characteristic parameters is a desideratum. The information obtained may be used to influence—for example, by regulation—the operational behavior of the respective hydraulic assemblies.

In motors, for example, the torque and the rpm can be determined from the magnitude of the operating pressure and the input flow rate. In percussion mechanisms it is possible to determine the individual impact energy and the impact frequency of the percussion pistons and in cylinders the displacement force and displacement velocity may be ascertained. The magnitude of the operating pressure and the supply flow rate of an energy generator and the magnitude of the input flow rate of an energy consumer are usually determined by means of a pressure measuring unit and a flow rate measuring unit.

SUMMARY OF THE INVENTION

It is an object of the invention to provide an improved measuring device of the above-outlined type that is of simple construction, operates reliably at low losses and offers multiple applicability, for example as a monitoring device, as a testing device for maintenance work or as a measuring device for the automatic control of an energy generator or energy consumer.

The invention is based on the recognition that a statically indicated operating pressure has a superposed dynamic pressure component derived from the operational behavior of the hydraulic device. This alternating pressure component includes information which may provide additional valuable indications as to the operational behavior of the energy generator or energy consumer.

This object and others to become apparent as the specification progresses, are accomplished by the invention, according to which, briefly stated, the measuring device connectable to a pressure conduit of a hydraulic circuit for determining characteristic operational parameters of hydraulic energy converters forming components of the hydraulic circuit includes a measuring section having a conduit guiding pressurized fluid of the pressure conduit and a throttle in the conduit for effecting a pressure drop thereacross; a differential pressure transducer communicating with the conduit at an upstream side and a downstream side of the throttle as viewed in a direction of fluid flow for determining a pressure differential across the throttle and for generating a output signal representing the pressure differential; and an electrotransducer connected to an output of the differential pressure transducer for separating the output signal into an alternating voltage component signal and a direct voltage component signal. The electrotransducer has an output to which the alternating voltage component signal and the direct voltage component signal are applied.

The basic concept of the invention resides in the use of a measuring path including at least one throttle and a differential pressure transducer associated with the throttle for detecting the differential pressure thereacross. The output signal which is generated by the differential pressure transducer and which is divided by means of an electrotransducer into a direct voltage component and an alternating voltage component is applied to an evaluation circuit by the output terminals of the electrotransducer. The evaluation circuit may be composed of a display unit and/or a control unit for affecting the operating behavior. Since the measuring device requires only a suitable connection to the pressure conduit of the energy supplier and/or energy consumer, it may be used without regard to the construction of the energy supplier/consumer.

In the simplest embodiment, the measuring device includes a measuring section having a throttle, an associated differential pressure transducer and an after-connected electrotransducer. Such an embodiment allows an observation, verification and control of the operational behavior of an individual hydraulic assembly while considering the dynamic pressure component. Thus, for example, the frequency of the dynamic pressure component constitutes a measure for the rpm of a pump—and thus also a measure for the flow rate—which supplies fluid to an after-connected cylinder as the energy consumer. The frequency of the dynamic pressure component, however, also permits a determination of a motor rpm or the number of striking piston strokes of a percussion mechanism from which further information regarding, for example, the state of wear of the energy consumer can be derived. Further, the measuring device may be so designed that simultaneously the dynamic pressure component of two hydraulic assemblies—for example a pump and an after-connected energy consumer—can be determined. For such a case, the measuring section includes a measuring throttle and two serially-connected throttles arranged parallel to the measuring throttle. The serially-connected throttles are shielded from one another by a damping element and each throttle includes a differential pressure transducer and an after connected electrotransducer.

The damping element which separates the serially-connected throttles of the measuring section regarding oscillation, is preferably a pressure accumulator (for example, a diaphragm reservoir) disposed between the throttles.

According to a further feature of the invention, at least some of the throttles are flow-constricting baffles. This ensures that the measuring device operates at least substantially independently of viscosity and temperature, that is, it is independent of the characteristics of the hydraulic fluid employed. The field of application and the mode of operation of the measuring device of the invention can be positively affected by providing that at least one of the baffles has an adjustable flow passage area.

According to a further feature of the invention, each electrotransducer may be an electrical separating filter known by itself which, by a highpass filter (in the simplest case a capacitor) and by an inductance (acting as choke) separates the alternating voltage component of the output signal from its direct voltage component.

The frequency of the alternating voltage component corresponds to the frequency of the dynamic pressure component and is thus directly proportional, for example, to the rpm of a pre-connected pump or an after-connected motor or corresponds to the number of strokes of the striking piston in a percussion mechanism. The direct voltage component is proportional to the static pressure component and thus constitutes a measure for the supply flow rate of a pump or the actual intake flow rate of a motor or a percussion mechanism. The partial signals picked up at the output terminals of the electrotransducer may be utilized for display for recording or as input values for a control circuit.

BRIEF DESCRIPTION OF THE DRAWING

FIG. 1b is a block diagram of a substitute component for replacing a component shown in FIG. 1a.

FIG. 1c is a block diagram of another substitute component for replacing a component shown in FIG. 1a.

FIG. 2b is a block diagram of an additional component connected to a component shown in FIG. 2a.

DESCRIPTION OF THE PREFERRED EMBODIMENTS

Figure 1A:
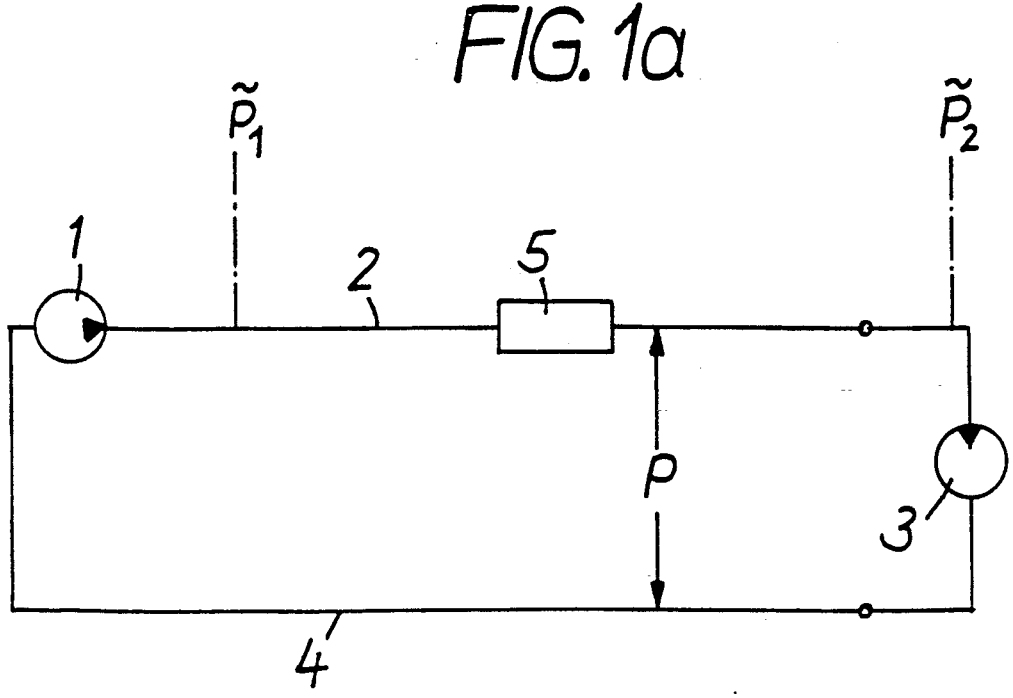
FIG. 1a is a block diagram of a hydraulic circuit incorporating the invention.

In the arrangement according to FIG. 1a, a pump 1 drives an energy consumer, such as a hydraulic motor 3 by way of a pressure conduit 2. A return conduit 4 reintroduces the hydraulic medium from the motor 3 into the intake side of the pump 1. The latter supplies an operating pressure p to the motor 3. A measuring device 5 is installed in the pressure conduit 2 for determining the dynamic pressure component pl generated by the operation of pump i and/or the dynamic pressure component $p_2$ generated by the motor 3. The frequency of the dynamic pressure component $p_2$ is a measure for the actual rpm of the motor 3. From the deviations between the actual rpm determined in this manner and the desired rpm to be expected on the basis of the input flow rate taken u by the motor conclusions may be drawn concerning manufacturing tolerances or the wear state of the motor and/or the state of the hydraulic fluid.

Figures 1B, 1C:
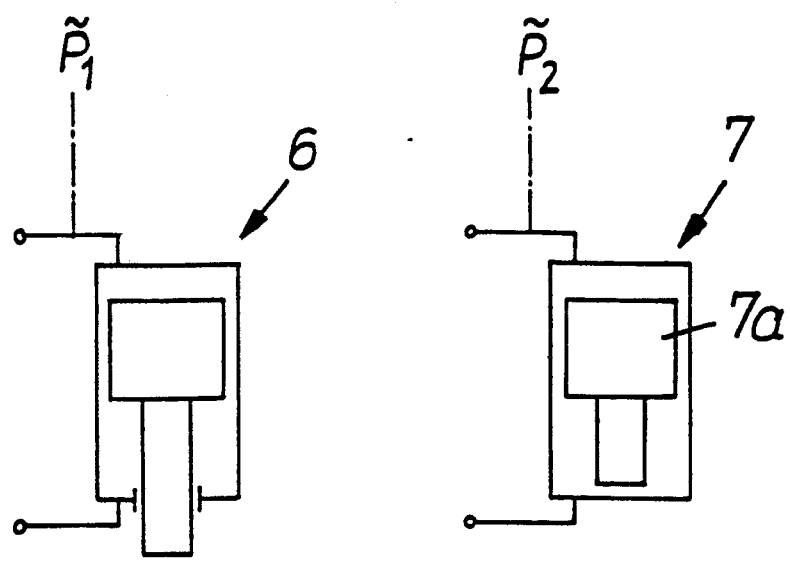

If, as shown in FIG. 1b, instead of the motor 3 a cylinder 6 is driven by the pump 1, the frequency of the dynamic pressure component $p_1$ constitutes a measure for the actual rpm of the pump 1 and thus a measure for the intake flow rate of a new pump while using a hydraulic fluid of the prescribed viscosity. Deviations from the desired intake flow rate—determined on the basis of a direct measurement of the supply flow rate—provide information about manufacturing tolerances or the wear state of pump 1 and/or about the state of the hydraulic fluid (that is, for example, whether a hydraulic fluid having an unsuitable viscosity could lead to increased leakages).

If, as shown in FIG. 1c, instead of the motor 3 a percussion mechanism 7 (including a striking piston 7a that moves back and forth in the longitudinal direction) is supplied with driving energy by way of the pump 1, the frequency of the dynamic pressure component $p_2$ directly indicates the number of strokes of the striking piston 7a. Maintaining the intake flow rate constant, this number changes as a function of the resistance of the material worked by a tool bit (not shown) driven by the percussion mechanism 7. The number of strokes of the striking piston derived from the dynamic pressure component $p_2$ and/or the supply flow rate determined from $p_1$ can be employed individually or as a ratio between the number of striking piston strokes and the supply flow rate as input values for a regulation of the number of strokes. The last-mentioned ratio and the previously-discussed dynamic pressure components may also be utilized to determine the wear state and the running behavior of the percussion mechanism.

Figure 2A:
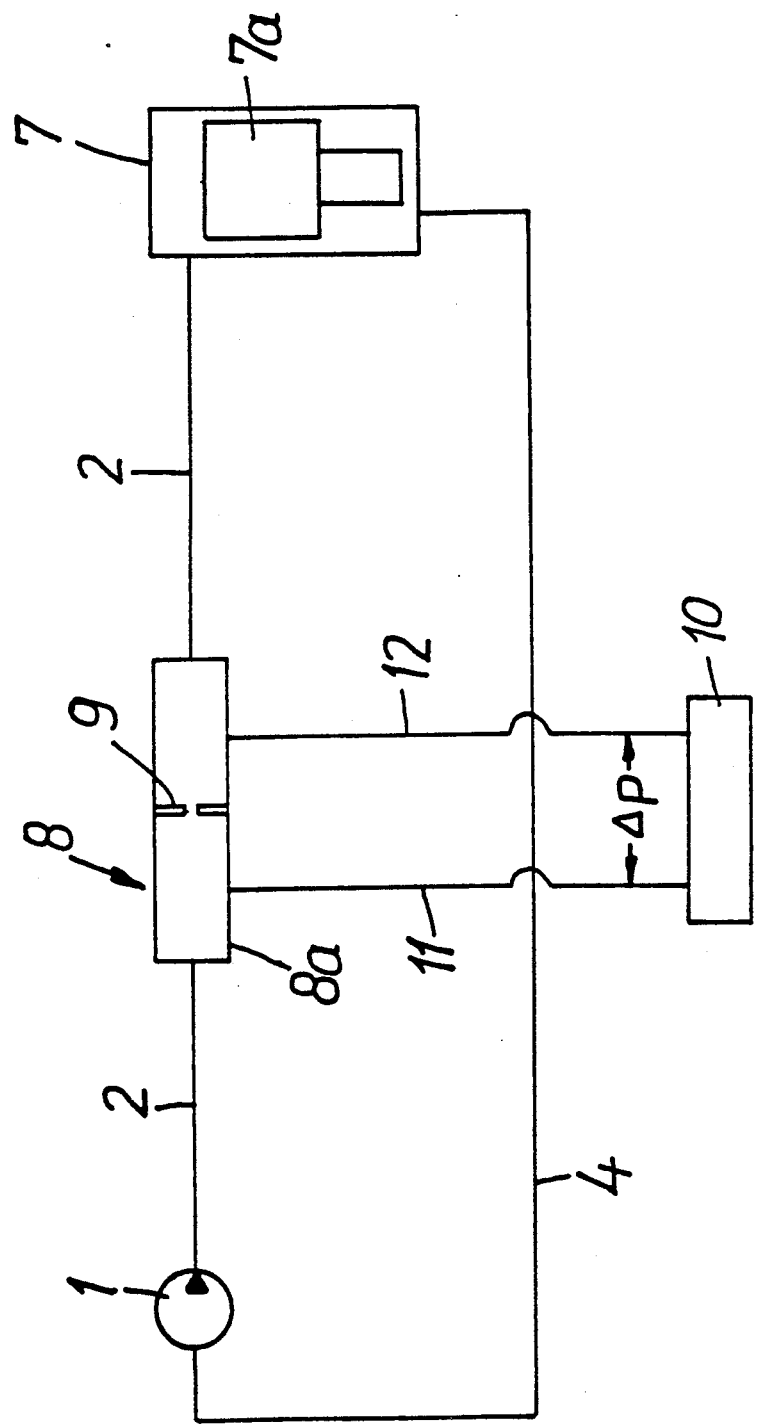
FIG. 2a is a block diagram of details of a component shown in FIG. 1a, according to a preferred embodiment.
Figure 2B:
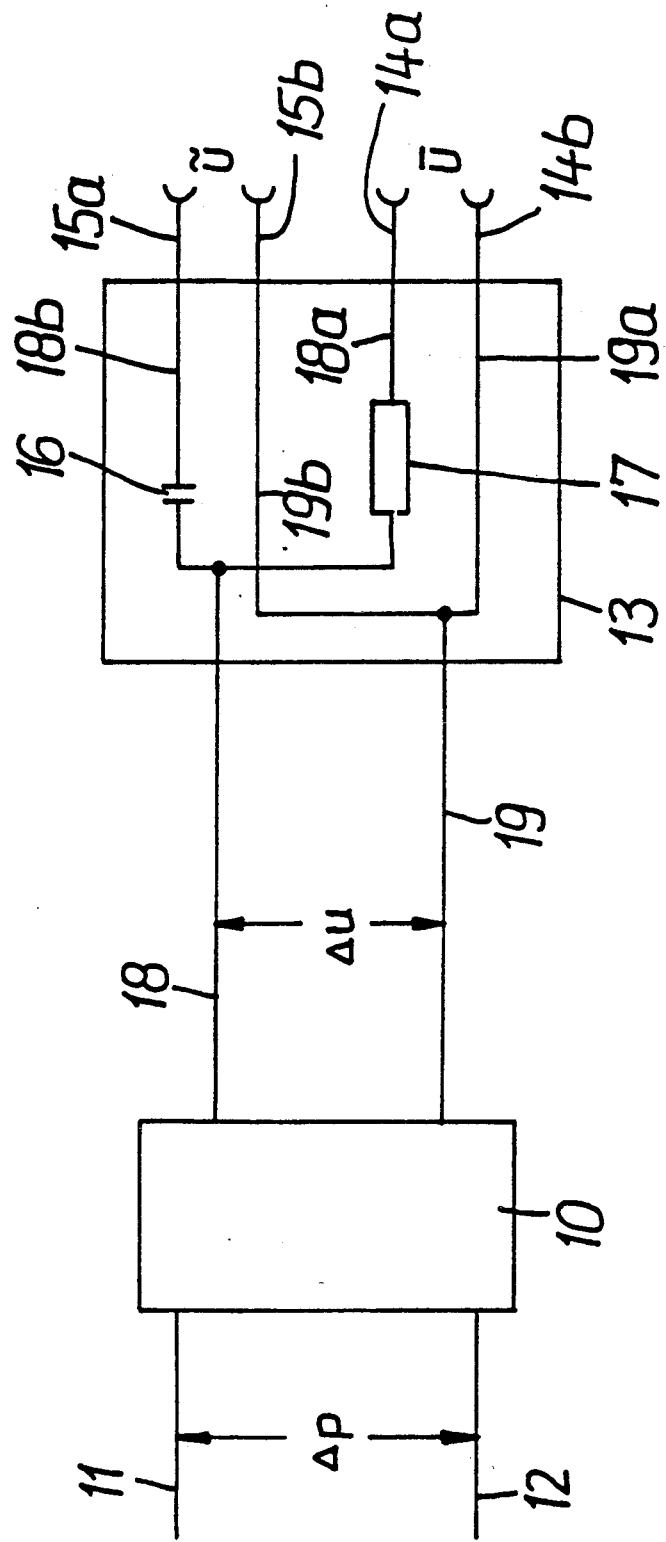

FIGS. 2a and 2b show the basic construction of the measuring device 5, illustrated for the case where the percussion tool 7 (FIG. 1c) is connected to the hydraulic circuit.

A significant component of the measuring device is a measuring section 8 which is installed in the pressure conduit 2 between the pump 1 and the percussion mechanism 7. The dimensions of the measuring section 8 are determined by a housing 8a which acts as a conduit for the hydraulic medium driven by the pump I in the pressure conduit 2. The measuring section 8 is subdivided by a throttle formed of a viscosity-independent, flow-constricting baffle 9. The pressure drop $\Delta p$ occurring across the baffle 9 is converted by means of a differential pressure transducer 10—whose input is connected by connecting lines 11 and 12 with the measuring section 8—into a voltage $\Delta u$ which, in turn, is divided by means of an after-connected electrotransducer 13 a direct voltage component signal $\overline{u}$ and an alternating into a direct voltage component signal $\overline{u}$ and an alternating voltage component signal $\tilde{u}$ which are applied to an evaluation circuit (not shown) from output terminals 14a, 14b and 15a, 15b, respectively. In the illustrated embodiment the electrotransducer 13 is an electrical separating filter, including parallel conductors 18a, 18b ending in output terminals 14a and 15a and parallel conductors 19a, 19b ending in output terminals 14b, 15b. The conductors 18a, 18b and 19a, 19b are connected by respective conductors 18 and 19 with the output of the differential pressure transducer 10. A capacitor 16 serving as a highpass filter and an inductance 17 serving as a choke are connected to conductors 18a, 18b, respectively.

The static or dynamic pressure component in pressure conduit 2 can be picked up as a direct or alternating voltage component, respectively, by way of terminals 14a, 14b and 15a, 15b. The direct voltage component constitutes a measure for the flow rate in pressure conduit 2, and the frequency of the alternating voltage component permits a determination of the number of strokes of the striking piston 7a or the rpm of the pump 1 and the motor 3 if the hydraulic circuit contains the motor 3 according to FIG. 1a.

Figure 3:
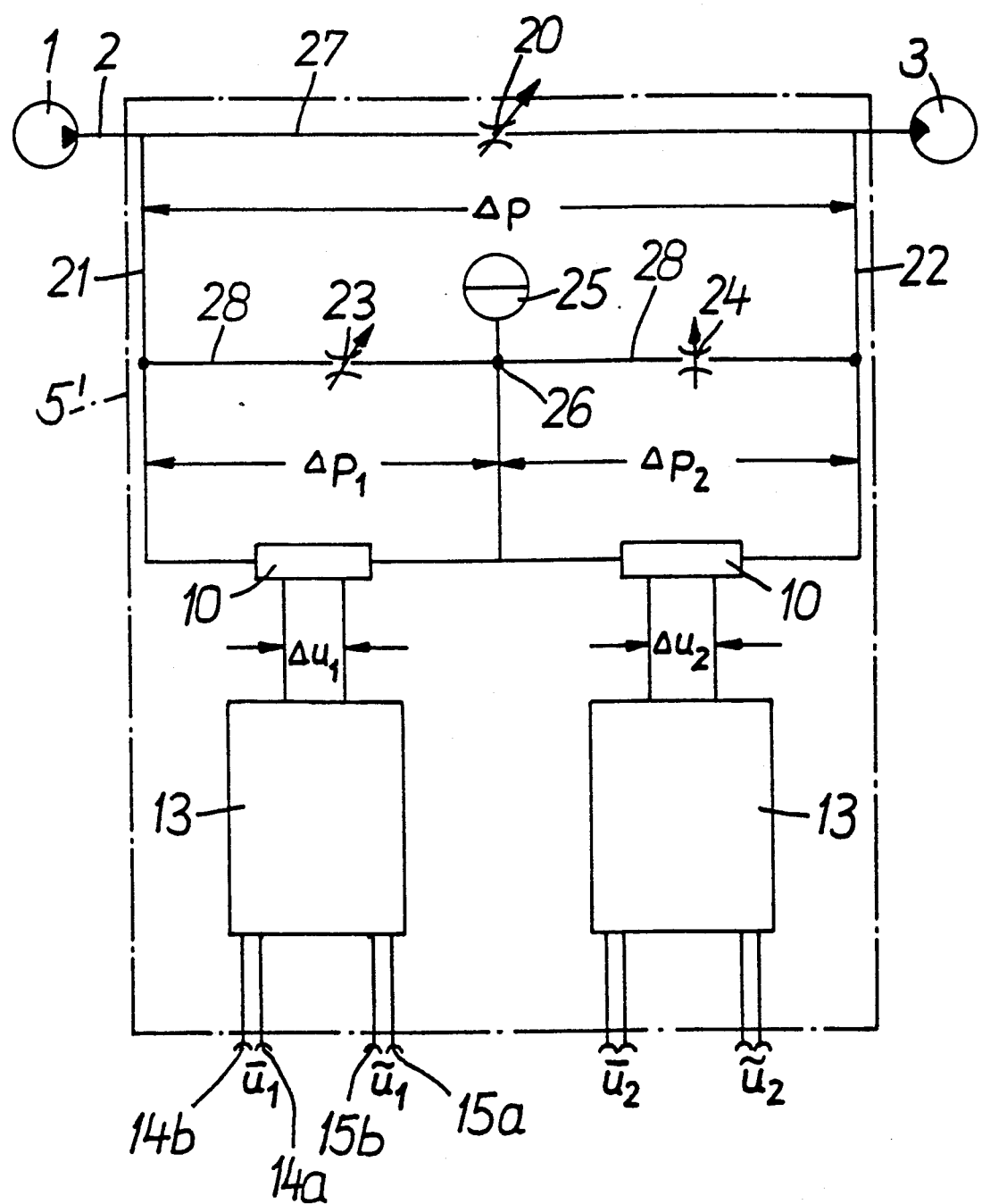
FIG. 3 is a block diagram of a hydraulic circuit incorporating another preferred embodiment.

FIG. 3 shows an embodiment of the measuring device 5' which is connected in the pressure conduit 2 and which simultaneously permits the determination of two dynamic pressure components, namely the alternating pressure generated by the pump (energy supplier) 1 and the alternating pressure generated by the motor (energy consumer) 3.

Departing from the earlier-described embodiment, the measuring section according to the FIG. 3 embodiment includes, in a conduit 27, a measuring throttle 20 and, in parallel therewith, two series-connected throttles 23 and 24 which are coupled, by a conduit 28, to measuring conduits 21, 22 and are shielded from one another with respect to vibrations by means of a damping element, such as a pressure vessel 25, connected to the conduit 28. The difference in the pressures prevailing in the measuring conduits 21 and 22 is the differential pressure $\Delta p$.

The partial pressures across the throttles 23 and 24 (measured between the measuring conduit 21 and the center point 26 and between the latter and the measuring conduit 22, respectively) are designated at $\Delta p_1$ and $\Delta p_2$, respectively. The partial pressures are converted by separate differential pressure transducers 10 into electrical output signals $\Delta u_1$ and $\Delta u_2$, respectively. The output signals $\Delta u_1$ and $\Delta u_2$ are, in turn, divided by an electrotransducer 13 into a direct voltage component $\overline{u}_1$, $\overline{u}_2$ and an alternating voltage component $\tilde{u}_1$, $\tilde{u}_2$. These voltage components can be picked up for further evaluation at the respective associated terminals 14a, 14b and 15a, 15b.

At the same time, the frequency of the alternating voltage components $\tilde{u}_1$ and $\tilde{u}_2$ also permits derivation of the magnitude of the theoretical supply flow rate of pump 1 and, for the operation of a percussion mechanism 7 (FIG. 1c), the magnitude of the number of striking piston strokes. Thus it is possible to employ the ratio of number of strokes and the supply flow rate as the input value for a control of the percussion mechanism 7. Preferably, in the embodiment of the measuring device according to FIG. 3 as well, the measuring throttle 20 and the two series-connected throttles 23, 24 are viscosity-independent, flow-constricting baffles.

It will be understood that the above description of the present invention is susceptible to various modifications, changes and adaptations, and the same are intended to be comprehended within the meaning and range of equivalents of the appended claims.

What is claimed is:

1. A measuring device connectable to a pressure conduit of a hydraulic circuit for determining characteristic operational parameters of hydraulic energy converters forming components of the hydraulic circuit, comprising (a) a measuring section including a conduit guiding pressurized fluid of the pressure conduit and a throttle in said conduit for effecting a pressure drop thereacross;

(b) a differential pressure transducer means communicating with said conduit at an upstream side and a downstream side of said throttle as viewed in a direction of fluid flow for determining a pressure differential across said throttle and for generating an output signal representing said pressure differential; and (c) an electrotransducer means connected to an output of said differential pressure transducer means for separating said output signal into an alternating voltage component signal and a direct voltage component signal; said electrotransducer means having an output to which said alternating voltage component signal and said direct voltage component signal are applied.

2. A measuring device as defined in claim I, wherein said electrotransducer means comprises an electric filter having a highpass filter and an inductance for separating the alternating voltage component signal of said output signal from the direct voltage component signal of said output signal.

3. A measuring device as defined in claim 1, wherein said throttle comprises a flow-constricting baffle.

4. A measuring device as defined in claim 3, wherein said flow-constricting baffle has a variable flow passage area.

5. A measuring device connectable to a pressure conduit of a hydraulic circuit for determining characteristic operational parameters of hydraulic energy converters forming components of the hydraulic circuit, comprising (a) a measuring section including
        (1) a first conduit guiding pressurized fluid of the pressure conduit;
        (2) a first throttle in said first conduit for effecting a pressure drop thereacross;
        (3) a second conduit connected to said first conduit parallel to said first throttle;
        (4) a second and a third throttle connected in series in said second conduit; and
        (5) a damping element connected in said second conduit between said second and third throttles for hydraulically screening said second and third throttles from one another;

(b) a first differential pressure transducer communicating with said second conduit at an upstream side and a downstream side of said second throttle as viewed in a direction of fluid flow for determining a first pressure differential across said second throttle and for generating a first output signal representing said first pressure differential; pressure differential transducer (c) a second pressure differential transducer communicating with said second conduit at an upstream side and a downstream side of said third throttle as viewed in a direction of fluid flow for determining a second pressure differential across said third throttle and for generating a second output signal representing said second pressure differential;

(d) a first electrotransducer connected to an output of said first differential pressure transducer for separating said first output signal into a first alternating voltage component signal and a first direct voltage component signal; said first electrotransducer having a first output to which said first alternating voltage component signal and said first direct voltage component signal are applied; and (e) a second electrotransducer connected to an output of said second differential pressure transducer for separating said second output signal into a second alternating voltage component signal and a second direct voltage component signal; said second electrotransducer having a second output to which said second alternating voltage component signal and said second direct voltage component signal are applied.

6. A measuring device as defined in claim 5, wherein said damping element comprises a pressure accumulator.

7. A measuring device as defined in claim 5, wherein each electrotransducer means comprises an electric filter having a highpass filter and an inductance for separating the respective alternating voltage component signal of the respective output signal from the respective direct voltage component signal of the respective output signal.

8. A measuring device as defined in claim 5, wherein said first throttle and at least one of said second and throttles comprise a flow-constricting baffle.

9. A measuring device as defined in claim 8, wherein at least one of said flow-constricting baffles has an aperture of variable flow passage area.

* * * * *

UNITED STATES PATENT AND TRADEMARK OFFICE
CERTIFICATE OF CORRECTION

PATENT NO. : 5,168,753

DATED : December 8, 1992

INVENTOR(S) : Friedrich Karl Arndt et al

It is certified that error appears in the above-identified patent and that said Letters Patent is hereby corrected as shown below:

On the title page, item [54] and column 1, lines 2-5, the title should read --MEASURING DEVICE FOR DETECTING PARAMETERS CHARACTERIZING THE OPERATING BEHAVIOR OF HYDRAULIC ASSEMBLIES--.

Signed and Sealed this

Second Day of November, 1993

*Attest:*

BRUCE LEHMAN

*Attesting Officer*   Commissioner of Patents and Trademarks